United States Patent
Pan

(10) Patent No.: US 10,215,629 B2
(45) Date of Patent: Feb. 26, 2019

(54) HANDHELD OPTICAL RADIATION METER AND CORRECTION METHOD THEREOF

(71) Applicant: EVERFINE PHOTO-E-INFO CO., LTD., Hangzhou (CN)

(72) Inventor: Jiangen Pan, Hangzhou (CN)

(73) Assignee: EVERFINE PHOTO-E-INFO CO., LTD., Hangzhou (CN)

( * ) Notice: Subject to any disclaimer, the term of this patent is extended or adjusted under 35 U.S.C. 154(b) by 0 days.

(21) Appl. No.: 14/772,970

(22) PCT Filed: Dec. 24, 2013

(86) PCT No.: PCT/CN2013/090307
§ 371 (c)(1),
(2) Date: Sep. 4, 2015

(87) PCT Pub. No.: WO2015/010435
PCT Pub. Date: Jan. 29, 2015

(65) Prior Publication Data
US 2016/0011045 A1    Jan. 14, 2016

(30) Foreign Application Priority Data

Jul. 26, 2013 (CN) .......................... 2013 1 0321501

(51) Int. Cl.
*G01J 1/44* (2006.01)
*G01J 3/02* (2006.01)
(Continued)

(52) U.S. Cl.
CPC ............... *G01J 1/44* (2013.01); *G01J 1/0233* (2013.01); *G01J 1/42* (2013.01); *G01J 3/0272* (2013.01);
(Continued)

(58) Field of Classification Search
CPC .......... G01J 3/28; G01J 1/0233; G01J 1/0252; G01J 1/10; G01J 1/42; G01J 1/4204; G01N 21/251
See application file for complete search history.

(56) References Cited

U.S. PATENT DOCUMENTS 4,090,071 A * 5/1978 McCarter ................. G01J 1/42
250/238
5,424,826 A * 6/1995 Kinney ................. G01J 3/2803
356/326
(Continued)

FOREIGN PATENT DOCUMENTS

CN          101034006 A     9/2007
CN          101290246 A    10/2008
(Continued)

OTHER PUBLICATIONS

Tapio Finnilä, "A colorimetric multivariable feedback control system for test environment ambient light control", Mar. 4, 2008.*
(Continued)

*Primary Examiner* — Maurice Smith
(74) *Attorney, Agent, or Firm* — Kratz, Quintos & Hanson, LLP

(57) ABSTRACT

The present invention discloses a handheld optical radiation meter and a correction method thereof. The handheld optical radiation meter has a photometric measurement module, a spectral measurement module and a screen. The spectral quantities of the spectral measurement module are employed to correct the spectral mismatch error of the photometric measurement module. With simple configuration, the present invention can realize high accuracy photometry and chromaticity measurement within a wide-span dynamic range, and has the characteristics of complete test functions, high measurement accuracy, convenient operation, low cost, etc.

9 Claims, 2 Drawing Sheets

(51) Int. Cl.
*G01J 1/42* (2006.01)
*G01J 3/28* (2006.01)
*G01J 3/36* (2006.01)
*G01J 1/02* (2006.01)

(52) U.S. Cl.
CPC ........... *G01J 3/0286* (2013.01); *G01J 3/0291* (2013.01); *G01J 3/28* (2013.01); *G01J 3/36* (2013.01); *G01J 2001/444* (2013.01)

(56) References Cited

U.S. PATENT DOCUMENTS

| | | | | |
|---|---|---|---|---|
| 7,236,243 | B2* | 6/2007 | Beecroft | G01J 3/02 356/328 |
| 2002/0061191 | A1* | 5/2002 | Motomura | G03B 7/08 396/165 |
| 2006/0290929 | A1 | 12/2006 | Imura | |
| 2008/0259318 | A1* | 10/2008 | Pan | G01J 3/02 356/73 |
| 2009/0066938 | A1* | 3/2009 | Liu | G01J 1/04 356/226 |
| 2014/0246571 | A1* | 9/2014 | Li | G01J 1/0407 250/227.11 |
| 2014/0354868 | A1* | 12/2014 | Desmarais | H04N 5/23293 348/333.01 |
| 2015/0338307 | A1* | 11/2015 | Aggarwal | G01M 11/00 356/300 |

FOREIGN PATENT DOCUMENTS

| | | |
|---|---|---|
| CN | 101782428 A | 7/2010 |
| CN | 101813518 A | 8/2010 |
| CN | 102012266 A | 4/2011 |
| CN | 202188903 U | 4/2012 |
| CN | 202676283 U | 1/2013 |
| CN | 103344329 A | 10/2013 |
| CN | 203337259 U | 12/2013 |
| JP | 2006-284315 A1 | 10/2006 |

OTHER PUBLICATIONS

International Search Report for International Application No. PCT/CN2013/090307 dated Apr. 22, 2014.

* cited by examiner

HANDHELD OPTICAL RADIATION METER AND CORRECTION METHOD THEREOF

BACKGROUND OF THE INVENTION

1. Technical Field

The present invention relates to the field of light and radiation measurement, in particular to a handheld optical radiation meter.

2. Description of Related Art

Optical radiation measurement devices have been widely used in the field of on-site lighting, industrial lighting, laboratory lighting, etc. However, those devices have various disadvantages, such as low accuracy, narrow linear dynamic range, large size or inconvenience in use, etc. The devices operated at a laboratory with a high accuracy usually are large in size and very inconvenient for on-site measurement. Ever if those devices are moved to the laboratory, it is difficult to achieve high accuracy due to the huge difference between their working conditions and laboratory environment. Mini handheld devices are well portable, but usually rarely accurate spectral radiation information and illuminance.

The conventional handheld optical radiation meters, for example handheld illuminance meters only have photometer heads and therefore cannot realize the spectrum measurement, and further have serious $V(\lambda)$ spectral mismatch error. Those meters can only obtain the spectral information with low sensibility and a narrow illuminance range, especially when the illuminance is below 10 lux, both the accuracy of spectral measurement and photometric measurement are extremely low. Up to now, no handheld optical radiation meter is small in size and available for both laboratory and field, both irradiance and illuminance measurement simultaneously, both wide measurement dynamic range and high accuracy There are also no relevant technical reports.

BRIEF SUMMARY OF THE INVENTION

In order to overcome the defects in the prior art, the present invention aims to provide a handheld optical radiation meter capable of correcting the spectral mismatch error, measuring the irradiance, illuminance and chromaticity and other parameters concurrently, along with characteristics of a wide linear dynamic range, high accuracy, convenient operation, and low cost.

The present invention employs the following technical solution to realize the handheld optical radiation meter. A handheld optical radiation meter comprises a handheld host and a sampling device. The handheld host is provided with a screen display; the sampling device comprises a photometric measurement module and a spectral measurement module of which the photo surfaces are in parallel; the photometric measurement module includes a cosine corrector, a spectral response correction unit and a photoelectric sensor; the spectral measurement module includes a dispersion unit and an array detector; the photometric measurement module and a spectral measurement module receive the tested light.

According to the present invention, the photometric measurement module and the spectral measurement module are integrated within one sampling device. The test light directly or indirectly (like being reflected) radiate on the sampling device. The photo surfaces of the photometric measurement module and the spectral measurement module are juxtaposed and can receive the tested light and measure the photometric information and the spectral information respectively. Due to the excellent linearity within a large dynamic span of the photometric measurement module (for example, use of a silicon photocell as the photoelectric sensor), and the measuring waveband of spectral measurement module that covers or almost covers the measuring waveband of the photometric sensor, the spectral information measured by the spectral measurement module can be used to effectively correct the $V(\lambda)$ mismatch error of photometric detector according to formula (1), thus greatly enhancing the measurement accuracy of the photometry value.

The correction method for the handheld optical radiation meter in the above technical solution is characterized in that, the photometric measurement module and the spectral measurement module on the sampling device respectively measure the photometric and spectral information, and then the measurement value obtained by the spectral measurement module is used to correct the photometric measurement value obtained by the photometric measurement module so as to correct the $V(\lambda)$ spectral mismatch error, thus obtaining an accurate photometric quantity. The correction equation is as follows:

$$E_{T,C} = E_T \cdot \frac{\int_{\lambda_1}^{\lambda_2} P(\lambda) \cdot V(\lambda) \cdot d\lambda}{\int_{\lambda_1}^{\lambda_2} P(\lambda) \cdot S(\lambda)_{rel} \cdot d\lambda} \cdot \frac{\int_{\lambda_1}^{\lambda_2} P(\lambda)_S \cdot S(\lambda)_{rel} \cdot d\lambda}{\int_{\lambda_1}^{\lambda_2} P(\lambda)_S \cdot V(\lambda) \cdot d\lambda} \quad (1)$$

where, $E_{T,C}$ is the illuminance after correction; $E_T$ is the illuminance measured directly by the photometric measurement module; $P(\lambda)$ is the relative spectral power distribution measured by the spectral measurement module; $S(\lambda)_{rel}$ is the relative spectral sensitivity of the photometric measurement; $P(\lambda)_S$ is the relative spectral power distribution of the standard illuminant; $V(\lambda)$ is the CIE standard spectral efficiency function. $\lambda_1$ and $\lambda_2$ respectively are the initiating wavelength and ending wavelength for integration, with unit of nm, in and general, $\lambda_1$ and $\lambda_2$ are 380 nm and 780 nm, respectively.

After correction, the photometric value measured by the photometric measurement module has better linearity and improved accuracy. The absolute spectral irradiance $E_e(\lambda)$ of the spectral measurement module can be converted from the measurement value $E_{T,C}$ corrected by the photometric measurement module according to the following formula:

$$E_e(\lambda) = \frac{E_{T,C}}{K_m \cdot \int_{\lambda_1}^{\lambda_2} P(\lambda) \cdot V(\lambda) \, d\lambda} \cdot P(\lambda) \quad (2)$$

where, $K_m$ is the maximum spectral efficiency, 683 lm/W for photopic vision and 1725 lm/W for scotopic vision.

The irradiance value measured by the photometric measurement module can be accurately converted from the absolute spectral irradiance $E_e(\lambda)$ of the spectral measurement module.

In the present invention, the photo surfaces of both the photometric measurement module and the spectral measurement module are in the same level, or the optical axes of the two modules form a certain included angle. The relative positions of the two photo surfaces can be variable, just to ensure that both the two are able to receive incident light in same direction. The absolute measurement value of the spectral measurement module can be corrected according to the formula (2), or by software.

In a technical solution, a location mechanism for positioning the photo surface of the photometric measurement module is comprised, and the location mechanism is fixed relative to the photo-surface of the photometric measurement module. The location mechanism is used to accurately position the photo surface of the photometric measurement module. If the relative positions of the locating mechanism and the photo surface of the photometric measurement module are determined, the plane where the photo surface of the photometric measurement module can be determined through the relative positions of the locating mechanism and the photo surface of the photometric measurement module so as to obtain the illuminance of designated plane. Preferably, the locating mechanism and the photo surface of the photometric measurement module are coaxial; for example, the location mechanism is a circular threaded hole coaxial placed with the photo-surface of the photometric measurement module for accurate positioning, and cooperated with suitable mechanical parts, the location mechanism can also fix the sampling device. Additionally, the placement of the location mechanism is flexible, may be disposed inside or outside the sampling device, or located on a plane where the sampling device is.

In the present invention, a plurality of sampling devices is comprised; each device is electrically or wirelessly connected with the handheld host; and the measurement result of each sampling device is sent to the host. Different samplings devices are equipped to receive the tested light at different positions and acquire the photometric quantities, spectral quantities and chromatic quantities. For instance, the sampling devices are spatially distributed, and the basic photometric quantities and chromatic quantities of the incident light at each position, namely the photometric and chromatic distribution information, can be acquired by measurement at only one time. The depicted embodiment also comprises a microprocessor, positioned in the handheld host and/or the sampling device and employed to process and analyze the data send by the photometric measurement module and spectral measurement module. With respect to the microprocessor positioned in the handheld host, a screen is electrically connected with the microprocessor, the test results from the sampling devices are transmitted to the microprocessor to be processed, and the screen displays the analysis results after the microprocessor finishes data processing; or the microprocessor positioned inside the sampling device, the microprocessor directly processes the test data inside the sampling device and then transmits the processing results to the screen of the handheld host for display; or the test data can be reliably transmitted to a computer through a USB interface at a high speed. Additionally, the handheld host and the sampling device can be both equipped with a microprocessor, and the microprocessor in the sampling device collects the measurement data and transmits the measurement data to the microprocessor in the handheld host for analysis and processing.

Compared with the prior art, the present invention can implement spectral measurement and photometric measurement concurrently, employs the spectral quantities where the photometric measurement waveband is covered to correct the results measured by photometric measurement module on condition of low measurement accuracy of both the photometric and spectral measurement module so as to effectively correct the spectral mismatch error and improve the measurement accuracy of the handheld host radiation meter. Meanwhile, the present invention can also implement measurement of the chromatic and photometric distribution information, and has characteristics of wide linear dynamic range, high accuracy, convenient operation, and low cost.

The present invention can be further perfected by the following technical solution.

As an optimization, the handheld host and the sampling device are integrated and mutually connected; the photo surface of the sampling device can rotate or slide relative to the handheld host. The handheld host and the sampling device are mechanically or electrically connected, and the screen and the photo surface of the sampling device can also rotate or slide relative to each other at any angle to receive the light signal in various directions and at various positions so as to meet different measurement needs.

As an optimization, the handheld host and one or more than two sampling devices can be detached, and the handheld host is electrically or wirelessly connected with each sampling device. The handheld host and the sampling devices can be detached. Taking measurement in a field or on site as an example, the handheld device is fixed at a position while the sampling devices are located different positions and electrically or wirelessly connected with the handheld host to transmit the test data to the handheld host in a wired or wireless way.

As an optimization, the screen is colorful touchscreen, displaying the test results including illuminance, color temperature, color rendering index and spectral curve. The photometric and spectral quantities measured by the photometric and spectral measurement module in the sampling device are processed by the microprocessor and then displayed on the touchscreen. The displayed contents include but are not limited to the illuminance, relative spectral power distribution, absolute irradiance distribution, color temperature, color rendering index, chromaticity diagram, Planckian locus, standard deviation of color matching, and other photometric and spectral measurement results.

In a technical solution, the measurement results are displayed on the whole screen or on the split screen by swiping or clicking. In the present invention, the display mode is optional; the measurement result can be displayed on the whole screen; or different measurement results are displayed on split screens by swiping (pulling or dragging) left or right, up or down; or the screen only displays names or icons of the measurement results, and the measurement results are displayed by touching or clicking corresponding name or icon. The screen can respectively display the contents according to the categories of the measurement results on different interfaces. For example, the results related to illuminance like light illuminance, spectral irradiance, etc. are listed on one interface on the screen; the results related to color like color rendering index, color temperature, chromaticity diagram, Planckian locus, standard deviation of color matching and the like are listed on another interface on the screen. The results related to photobiological safety like UVI, UV damage, UV-A hazard for eyes, retinal blue light hazards, retinal thermal hazards, infrared radiation hazards for eyes, visible and infrared hazards for skins are listed on the other interface on the screen. The same interface of the touchscreen displays similar parameters for convenient analysis.

In a technical solution, the sampling device is provided with a temperature sensor module inside for correcting the thermal drift of the sampling device. The temperature sensor module can monitor and control the temperature of the sampling device in real time to maintain the temperature. The temperature sensor module can also monitor the temperature of the sampling device in real time to dynamically correct the measurement results of the sampling device so as to improve the accuracy. Meanwhile, the sampling device can also measure and display the temperature.

In the present invention, the number of the spectral measurement module can be one with a wavelength ranging from 380 nm to 780 nm, at least covering wavelength ranging from 400 nm to 700 nm. When necessary, two or more spectral measurement modules are needed to within an ultraviolet-to-infrared range of 200 nm-3000 nm.

As an optimization, more than one spectral measurement module of which the measurement waveband is overlapped end by end. The overlapped waveband covers the measurement waveband of the photometric measurement module. Compared with a spectral measurement module with a wide measurement waveband, use of two or more than two measurement wavebands with narrower measurement wavebands to jointly overlap the measurement waveband of the photoelectric measurement module can achieve higher spectral measurement accuracy.

In a technical solutions, two spectral measurement modules of which the measurement wavebands are overlapped end-by-end are comprised, a first spectral measurement module with an ultraviolet-visual-light measurement waveband and a second spectral measurement module with an visual-infrared-light measurement waveband, respectively. The measurement wavebands of the first light measurement waveband and the second spectral measurement module can be flexibly selected based on the measurement waveband of the photometric measurement module. For example, when the measurement waveband of the photometric measurement module is from 380 nm to 780 nm, then the measurement waveband of the first spectral measurement module is 200 nm-650 nm, and that of the second spectral measurement module 600 nm-1100 nm. Using the overlapped spectral information of the 380 nm-780 nm segment in the overlapped wavebands of the first and second spectral measurement modules to correct the spectral mismatch error of the photometric measurement module, then high accuracy measurement of the photometric quantities can be achieved. Moreover, the first spectral measurement module can obtain the spectral information within the ultraviolet waveband, so the ultraviolet spectral information can be used to evaluate the photochemical ultraviolet hazards for eyes and skins and the near ultraviolet hazards for eye. The second spectral measurement module can obtain the spectral information within the infrared waveband of the second spectral measurement module, so the infrared spectral information can be used to evaluate the near infrared hazards for eyes and the visible and infrared hazards for skins.

In a technical solution, both the photometric measurement module and the spectral measurement module are electrically connected with the handheld host. In order to implement control and data transmission, the handheld host is electrically connected with the sampling device via a data cable. The measurement results obtained by the photometric measurement module and the spectral measurement module are respectively transmitted the handheld host through data cables. Meanwhile, the handheld host can also send the test signal to the sampling device through the data cable. The photometric measurement module and the spectral measurement module in the sampling device receive the test signal from the handheld host and then start testing. The photometric measurement module and the spectral measurement module can select one of various wired ways to communicate with the handheld host. For example, female header (or pin header) and bayonet pin (or bayonet). The handheld host is provided with a handheld host communication interface, the sampling device is also provided with a sampling device communication interface, the handheld host communication interface and the sampling device communication interface are coupled. The handheld host communication interface consists of the female header (or pin header) and the bayonet pin (or bayonet), while the sampling device communication interface consists of the pin header (or female header) and the bayonet (or bayonet pin), the pin header and the female header control their connection state through the bayonet or bayonet pin; or the handheld host communication interface and the sampling device communication interface are connected through a USB communication interface.

In a technical solution, wireless modules configured for receiving and/or sending signals are comprised. Both the sampling device and handheld host are provided with the wireless module inside. The measurement result obtained by the photometric measurement module and the spectral measurement module in the sampling device are transmitted to the handheld host in a wireless mode. Here, the handheld host is a mobile intelligent terminal, like a pad, a smartphone or a special intelligent terminal. The sampling device and the handheld host are provided with the wireless module respectively; the two wireless modules form a wireless communication network, like Bluetooth, GPRS, Wi-Fi, WLAN, 3G, Zigbee, CDMA, etc. The specific form of the wireless network may vary with the specific application site and the measurement mode. The sampling device and the handheld host employ wireless communication there-between to implement computer control and data transmission. For example, the wireless module in the handheld host sends the test signal, and then the wireless module in the sampling device receives the test signal, triggers the spectral and photometric modules in the sampling device to receive the test signal, and after the test is finished, transmits the test results to the handheld host through the wireless communication network for analysis and processing.

As an optimization, an arithmetic unit for correcting the spectral mismatch error of the photometric measurement module is comprised. The arithmetic unit is placed inside the sampling device or handheld host. The arithmetic unit may be independent digital signal processing chips (DSCP), or editable and dispatchable correction algorithm programs in the microcomputer in the handheld host. In the case of DSCP, a register is also comprised. The DSCP uses the measurement results obtained by the spectral measurement module to acquire the correction coefficient of the spectral mismatch of the photometric measurement module; the correction coefficient is stored in the register to correct the photometric quantities measured by the photometric measurement module. If the arithmetic unit is an algorithm program, the microprocessor acquires the measurement results from the spectral measurement module, then calls the algorithm program to correct the correction coefficient of the spectral mismatch, and stores the correction coefficient for correcting the photometric quantities measured by the photometric measurement module, thus obtaining more accurate photometric quantities.

As an optimization, the identifier code memory placed inside the sampling device and configured for identifying the sampling device is comprised. The data stored in the identifier code memory can be read and written. The identifier code memory is electrically connected with the photometric measurement module and the spectral measurement module. The measurement module finishes data testing, reads the identifier code and transmits the test data and the identifier code to the handheld host. If the sampling device is provided with a digital signal processing chip, the identifier code memory is the chip memory, and the chip is electrically connected with photometric measurement and the spectral measurement module. After the test module finishes data processing, the digital processing chip processes the data, calls the identifier code, and transmits the test data and the identifier code to the handheld host such that the handheld host identifies the data transmitted from different sampling devices.

As an optimization, the handheld host is a mobile intelligent terminal, like a pad or smart-phone, with characteristics of being portable, convenient operation, and good expansibility. The terminal control and the sampling device can employ various ways to perform communication, making the test and control convenient and flexible, effectively improving the working efficiency, and meeting the application needs at various test sites.

As an optimization, the microprocessor stores the calibration data inside. During calibration, the microprocessor automatically calls the calibration data, thus simplifying the measurement operation and making the operation convenient and practical.

As an optimization, the sampling device includes batteries. The sampling device is provided with batteries. The batteries are usually rechargeable lithium batteries.

In conclusion, the present invention realizes synchronous measurement of the spectral quantities and photometric quantities of the tested light through the configuration of the integrated sampling device including situations where both the photometric measurement module and the spectral measurement module are not accurate, which uses the spectral quantities covering the photometric measurement waveband to efficiently correct the spectral mismatch errors in prior handheld photometers. It also has flexible selection for the measurement waveband of the photometric measurement module, and the present invention can also realize the accuracy of the photobiological safety of the tested light. The present invention has the characteristics of complete test functions, wide linear dynamic range, high measurement accuracy, convenient operation and low cost.

DETAILED DESCRIPTION OF THE INVENTION

Embodiment 1

Figure 1:
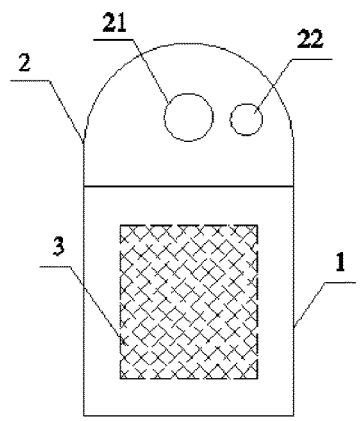
FIG. 1 is a schematic view of embodiment 1.
Figure 2:
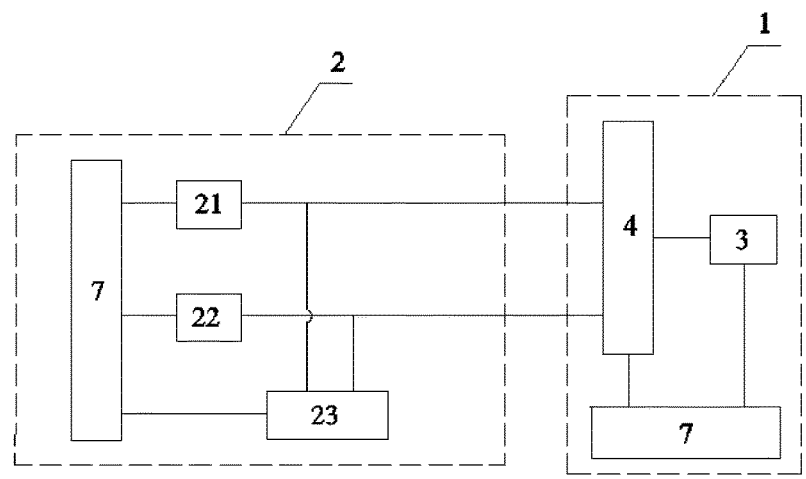
FIG. 2 is a connection diagram of embodiment 1.

As shown in FIGS. 1 and 2, this embodiment discloses a handheld optical radiation meter, comprising a handheld host (1), a sampling device (2), a screen (3); a microprocessor (4) and batteries (7). The screen (3) is disposed at the handheld host (1). The microprocessor (4) is disposed in the handheld host (1). The sampling device (2) is provided with an identifier code memory (23) inside and a photometric measurement module (21) and a spectral measurement module (22) of which the photo surfaces are juxtaposed. Both the handheld host (1) and the sampling device (2) are provided with the batteries (7) inside, wherein the batteries (7) in the sampling device (2) are rechargeable batteries, and the batteries (7) in the handheld host (1) can charge batteries (7) in the sampling device (2).

As shown in FIG. 2, the photometric measurement module (21), the spectral measurement module (22) and the identifier code memory (23) are all electrically connected with the batteries (7) inside the sampling device (2). The screen (3) and the microprocessor (4) are both electrically connected with the batteries (7) inside the handheld host (1). The photometric measurement module (21) and the spectral measurement module (22) are respectively electrically connected with the identifier code memory (23) and is connected with the microprocessor (4) inside the handheld host (1) through a USB. The screen (3) is electrically connected with the microprocessor (4).

The photo surfaces of the photometric measurement module (21) and the spectral measurement module (22) are juxtaposed during the measurement. The measurement waveband of the photometric measurement module (21) is a range of 380 nm-780 nm, while the spectral measurement module (22) is in a range of 350 nm-800 nm, which means the measurement waveband of the spectral measurement module (22) covers that of the photometric measurement module (21). The photometric measurement module (21) and the spectral measurement module (22) receive the test light at the same time. After measurement, the identifier code in the identifier code memory 23 is read, then the measurement results of the photometric and spectral measurement modules and the identifier code in the identifier code memory (1) are respectively transmitted into the microprocessor (4) of the handheld host to be analyzed or processed. The microprocessor (4) analyzes and processes the measurement data, uses spectral quantities of the spectral measurement module (22) to correct the spectral mismatch error of the photometric measurement module (21). The correction formula is as follows:

$$E_{T,C} = E_T \cdot \frac{\int_{380}^{780} P(\lambda) \cdot V(\lambda) \cdot d\lambda}{\int_{380}^{780} P(\lambda) \cdot S(\lambda)_{rel} \cdot d\lambda} \cdot \frac{\int_{380}^{780} P(\lambda)_S \cdot S(\lambda)_{rel} \cdot d\lambda}{\int_{380}^{780} P(\lambda)_S \cdot V(\lambda) \cdot d\lambda}$$

Wherein, $E_{T,C}$ is the corrected illuminance; $E_T$ is the illuminance of the tested light, measured directly by the photometric measurement module (21); $P(\lambda)$ is the relative spectral power distribution of the tested light, measured by the spectral measurement module (22); $S(\lambda)_{rel}$ is the relative spectral sensitivity of the photometric measurement module (21); $P(\lambda)_S$ is the relative spectral power distribution of the standard illuminant for calibrating the photometric measurement module (21); $V(\lambda)$ is the CIE standard spectral efficiency function.

After the measurement value of the photometric measurement module (21) is corrected, accurate illuminance can be obtained. Test data or analysis results thereof are directly displayed on the screen (3) of the handheld host (1).

In this embodiment, the screen (3) is a colorful touch screen. The displayed contents including illuminance, relative spectral power distribution, absolute spectral irradiance, color temperature, color rendering index, chromaticity diagram, black-body locus, standard deviation of color matching (SDCM), etc.

Embodiment 2

Figure 3:
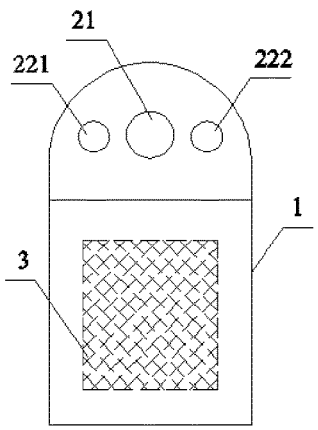
FIG. 3 is a schematic view of embodiment 2.

As shown in FIG. 3, different from embodiment (1) in that, in this embodiment, the sampling device 2 is provided with a photometric measurement module (21), a first spectral measurement module (221) and a second spectral measurement module (222), and the identifier code memory (23) inside. The photometric measurement module (21), the first spectral measurement module (221) and the second spectral measurement module (222) are respectively electrically connected with the identifier code memory (23), and are connected with the microprocessor (4) in handheld host (1) through USB. The screen (3) is electrically connected with the microprocessor (4).

The photo surfaces of photometric measurement module (21), the first spectral measurement module (221) and the second spectral measurement module (222) are juxtaposed, The measurement waveband of the photometric measurement module (21) is in a range of 380 nm-780 nm, the first spectral measurement module (221) in a range of 200 nm-650 nm, and the second module (222) in a range of 600 nm-1100 nm. The photo surfaces of photometric measurement module (21), the first spectral measurement module (221) and the second spectral measurement module (222) concurrently receive the tested light. After the measurement is finished, the measurements results and the identifier code called from the identifier code memory (23) are transmitted to the microprocessor (4) of the handheld host (1) via a data cable. The microprocessor (4) analyzes and processes the received data, uses the spectral quantities in a 380 nm-780 nm waveband measured by the first and second spectral measurement modules (221) and (222) to correct the spectral mismatch error of the photometric measurement module (21) to obtain accurate photometric quantities. Additionally, the microprocessor (4) can also analyze the ultraviolet spectrum measured by the first spectral measurement module (221) and the infrared spectrum by the second spectral measurement module (222) to evaluate the photobiological safety information of the tested light. The above test data and analysis results all are directly displayed on the screen (3) of the handheld host (1).

Embodiment 3

Figure 4:
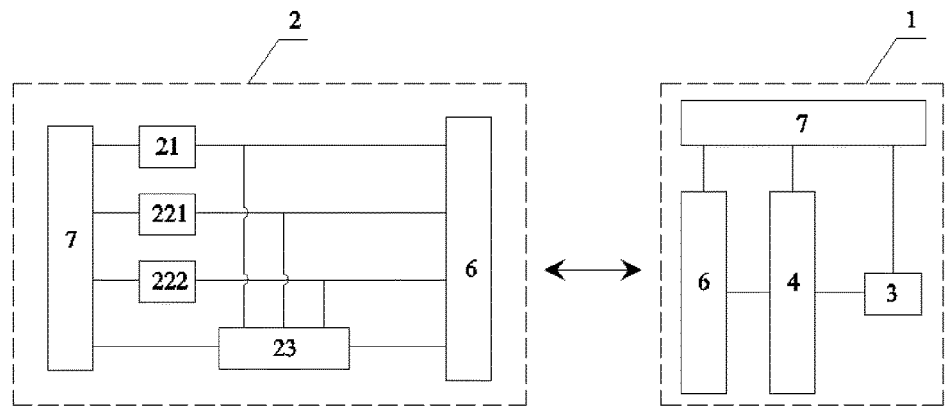
FIG. 4 is a connection diagram of embodiment 3.

As shown in FIG. 4, different from embodiment (1) in that, this embodiment also comprises wireless modules (6) and five sampling devices (2). The handheld host (1) and the sampling devices (2) are all provided with the wireless module (6) inside. Each sampling device is provided with the photometric measurement module (21), the first and second spectral measurement modules (221), (221), and the identifier code memory (23) inside.

The photometric measurement module (21), the first and second spectral measurement module (221), (221) are respectively electrically connected with the identifier code memory (23) and electrically connected with the wireless modules (6), while the wireless modules (6) are electrically connected with the batteries (7). Here, the handheld host (1) is mobile intelligent terminal. The wireless module (6) in the handheld host (1) is electrically connected with the microprocessor (4) and the batteries (7). The screen (3) is electrically connected with the microprocessor (4).

The five sampling devices (2) are spatially distributed during the measurement. The wireless module (6) in the handheld host (1) sends a test signal, and the wireless module (6) in each sampling device (2) receives the test signal concurrently and triggers the spectral measurement module (22) and the photometric measurement module (21) in each sampling device to receive and measure the signal of the tested light. After the test is finished, the test data and the identifier code of each sampling device are transmitted through a wireless communication network consisting of the wireless modules (6) in each sampling device (2) and the handheld host (1). The wireless modules (6) in the handheld host (1) receive the test data and inputs the test data into the microcomputer (4) for analysis and processing.

Embodiment 4

Figure 5:
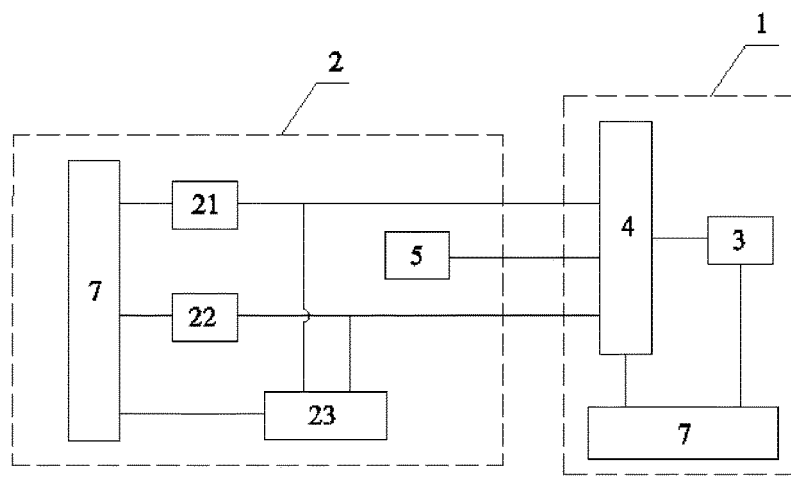
FIG. 5 is a schematic view of embodiment 4.

As shown in FIG. 5, different from embodiment (1) in that, this embodiment includes a temperature sensor module (5) positioned inside the sampling device (2); the temperature sensor module (5) is electrically connected with the handheld host (1). The temperature sensor module (5) can monitor and control the temperature of the sampling device (2) in real time, and transmit the real-time temperature of the sampling device (2) to the handheld host (1). The handheld host (1) analyzes and processes the temperature data to realize dynamical correction of corrects the measurement results obtained by the sampling device (2) and improve the measurement accuracy.

Embodiment 5

Figure 6:
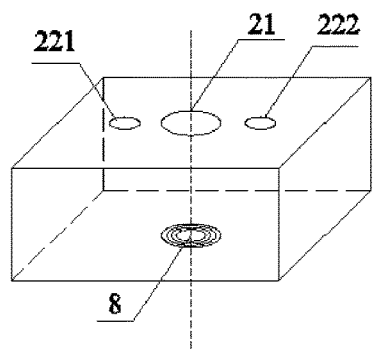
FIG. 6 is a schematic view of embodiment 5;
1—handheld host; 2—sampling device; 21—photometric measurement module; 22—spectral measurement module; 221—first spectral measurement module; 222—second spectral measurement module; 23—identifier code memory; 3—screen; 4—microcomputer; 5—temperature sensor module; 6—wireless module; 7—battery; 8—locating mechanism.

As shown in FIG. 6, different from embodiment (1) in that, this embodiment includes a locating mechanism (8) configured for positioning the photo surface of the photometric measurement module (21); the locating mechanism (8) is fixed relative to the photo surface of the photometric measurement module (21); the locating mechanism (8) is disposed on a plane of the sampling device (2) that is relative to photo surface of the photometric measurement module (21).

In this embodiment, the locating mechanism (8) is a circular threaded hole that is disposed to be coaxial with the photometric measurement module (21). The circular threaded hole can be matched with the tripod and other mechanical parts to fix the sampling device (2), thus accurately positioning the photo surface of the photometric measurement module (21). During measurement, the plane where the photo surface of the photometric measurement module (21) is can be determined through the locating mechanism (8) to obtain the illuminance on a specified plane.

What is claimed is:

1. A correction method for a handheld optical radiation meter, the handheld optical radiation meter including a handheld host (1) and a sampling device (2), said handheld host (1) being a mobile intelligent terminal provided with a screen display (3), said sampling device (2) comprising a photometric measurement module (21) and a spectral measurement module (22) of which photo surfaces are in parallel, wherein both the photometric measurement module and the spectral measurement module are integrated within a single sampling device: said photometric measurement module (21) including a cosine corrector, a spectral response correction unit and a photoelectric sensor, said spectral measurement module (22) including a dispersion unit and an array detector: and said photometric measurement module

(21) and said spectral measurement module (22) receiving measured light, wherein both the photometric measurement module and the spectral measurement module are electrically connected with the handheld host, the correction method, comprising the following steps of:
respectively measuring luminance and spectra information of the tested light by the photometric measurement module (21) and spectral measurement module (22) on the sampling device (2);
and correcting a measurement value of a photometric measurement module (21) using the measurement value of the spectral measurement module (22) to correct a spectral mismatch error of the photometric measurement module (21).

2. The correction method for the handheld optical radiation meter according to claim 1, characterized in that, said handheld host (1) and said sampling device (2) are integrated and mutually connected.

3. The correction method for the handheld optical radiation meter according to claim 2, characterized in that, the photo surface of said sampling device (2) is designed to rotate and/or slide relative to the handheld host (1).

4. The correction method for the handheld optical radiation meter according to claim 1, characterized in that, said handheld host (1) and at least one sampling device (2) are detached, while are connected in a wired or wireless way to exchange data.

5. The correction method for the handheld optical radiation meter according to claim 1, characterized in that, the receiving measured light is converted to measurement results and said screen display (3) is a touch screen, on which the measurement results including illuminance, color temperature, color rendering index and spectral distribution curve, are displayed in a way of whole screen or split screen by scrolling or separate screen by clicking respectively.

6. The correction method for the handheld optical radiation meter according to claim 1, characterized in that said sampling device (2) is internally provided with a temperature sensor module (5).

7. The correction method for the handheld optical radiation meter according to claim 1, characterized by the handheld optical radiation meter comprising at least one spectral measurement module (22), wherein when there is more than one spectral measurement module, ends of the measuring wavebands of the spectral measurement modules are overlapped.

8. The correction method for the handheld optical radiation meter according to claim 1, characterized in that, the sampling device (2) is internally provided with a battery (7) and/or an identifier code memory (23) for identifying the sampling device (2).

9. The correction method for the handheld optical radiation meter according to claim 1, characterized by the handheld optical radiation further comprising a location device (8) including a circular threaded hole to position the photo surface of photometric measurement module (21), wherein the location device (8) is fixed relative to the photo surface of the photometric measurement module (21).

* * * * *